June 9, 1931. J. M. MOORE 1,809,524
DAY AND NIGHT LICENSE PLATE FOR MOTOR VEHICLES
Filed Aug. 16, 1929
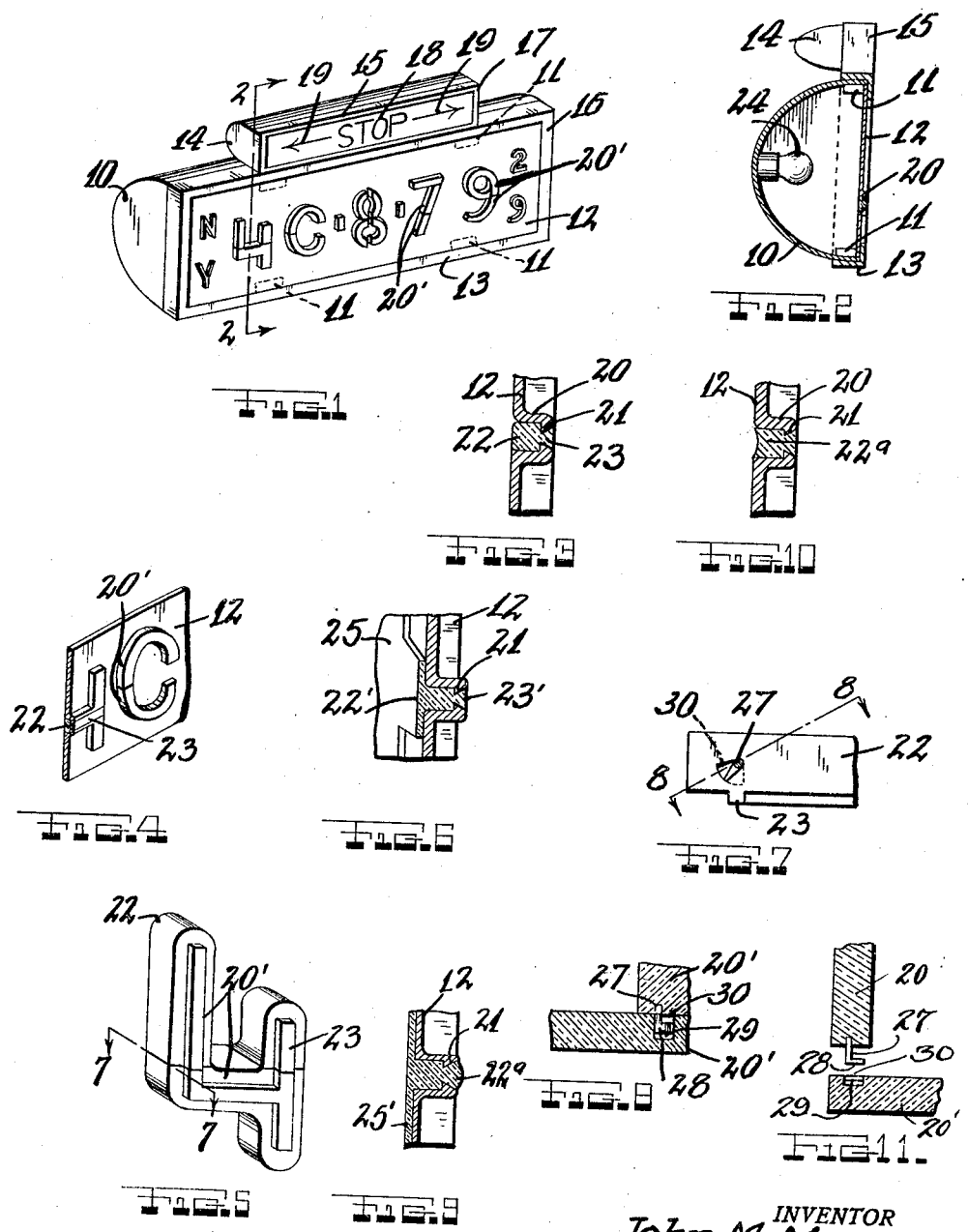
INVENTOR
John M. Moore
BY
ATTORNEY Patented June 9, 1931

1,809,524

UNITED STATES PATENT OFFICE

JOHN M. MOORE, OF NEW YORK, N. Y.

DAY AND NIGHT LICENSE PLATE FOR MOTOR VEHICLES

Application filed August 16, 1929. Serial No. 386,351.

This invention relates to new and useful improvements in a day and night license plate for motor vehicles.

The invention has for an object the provision of a device of the class mentioned which is of simple durable construction, dependable in use and efficient in action, and which can be manufactured and sold at a reasonable cost.

The invention proposes the use of a license plate with outwardly embossed numbers and letters having central cut-out portions, and glass letters preferably colored or translucent colored letters inserted in the said cut-out portions for being adapted to be illuminated so as to be visible in the night. This license plate may be supported in a casing provided with lights arranged for accomplishing the said illumination.

It is particularly intended to provide for the exchange of the translucent letters in the event of breakage, and it is proposed to make each of the letters of several separate interengaging sections. This allows for the replacement of broken sections instead of complete replacement of an entire letter.

It is pointed out that this license plate will be clearly readable on the darkest night. The common license plate lacks this feature though the advisability thereof has been generally recognized. Quite obviously, the instant arrangement will not effect the legibility of the license plate for day reading, in fact it is thought that it adds to this quality since the glass letters will be prominently surrounded by a border.

An auxiliary casing with a stop sign and right and left directional arrows may be added upon the license casing, and lights may be arranged therein for the operation of these signs.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:—

Fig. 1 is a perspective view of a device constructed according to this invention.

Fig. 2 is a transverse vertical sectional view taken on the line 2—2 of Fig. 1.

Fig. 3 is an enlarged detailed view of a portion of the license plate shown in Fig. 2.

Fig. 4 is a fragmentary perspective view of the license plate shown in Fig. 2.

Fig. 5 is a perspective view of one of the glass numbers used in the license plate.

Fig. 6 is a view similar to Fig. 3 but perspective and illustrating a modified form.

Fig. 7 is a fragmentary horizontal sectional view taken on the line 7—7 of Fig. 5, and Fig. 8 is a fragmentary vertical sectional view taken on the line 8—8 of Fig. 7.

Fig. 9 is a similar view to Fig. 3 showing a modified form of glass.

Fig. 10 is a similar view to Fig. 9, showing a further modification.

Fig. 11 is an enlarged detailed view of Fig. 8, but showing the two parts in a disengaged position.

The reference numeral 10 indicates generally a license plate casing of curved rear contour and provided with a plurality of stop members 11 against which license plate 12 rests, and a front cover 13 engaged on the casing holds the license plate in place. A smaller top auxiliary casing 14 is attached upon the casing 10 and an extension 15 from the cover 13 engages over the front of this casing. Nearly the entire front sides of the cover 13 and extension 15 are cut away forming openings 16 and 17 respectively.

A stop sign 18, and right and left directional signs 19 are mounted in the casing 14 directly behind the opening 17. The casing 14 has its rear side curved outwardly and is adapted to support lights for illuminating these signs, these lights being connected for operation according to whether a vehicle carrying the device is about to stop or turn.

The license plate 12 has outwardly embossed letters and numbers 20 having central cut-out portions 21. Glass letters 22 are engaged in the hollows formed by the embossed letters and have front reduced portions 23 projecting from the cut-out portions 21. The sides of these reduced portions are inclined as seen in Fig. 3 and the embossed letters 20 are squeezed together for causing the metal adjacent the cut-outs 21 to enter behind the inclined sides for holding the glass letters in place. Preferably these glass letters are of colored glass though they may be made from other translucent material.

Each of the symbols 20 is formed from separate sections indicated by the reference numerals 20' and means on the sections for locking adjacent sections together. The said means for locking the adjacent sections together comprises a pin 27 firmly fixed in one of the sections and engaging in an aperture 30 with an offset portion 29 formed in the adjacent section, and a finger 28 projecting at right angles from the lower end of the pin 27 and engaging in the offset portion 29. To separate the sections, one of the sections is turned with the pin 27 as an axis until finger 28 leaves the offset portion 29 and enters the aperture 30. The two sections can then be drawn apart. In Fig. 11 they are shown in a separated position. Because the sections are disengageable, replacement in the event of damage may easily be effected. In their interengaged positions, they are engaged within the license plate as previously described.

Lamps 24 are supported in the casing 10 directly behind the plate 12 for illuminating the glass letters when lit. The glass letters may be the same color as the color of the embossed letters 20' for not interfering with the legibility of the said letters, or the glass letters may be of a different color or shade for aiding to the legibility of the letters by providing bordered letters. In the dark and when the lamps 24 are lit, the glass letters will be very prominent and legible.

In the modified form of the device illustrated in Fig. 6, letters 22' have been shown provided with front reduced portions 23' having tapered sides engaging in the cut-out portions 21, and formed with rear flanges 25 engaging against the rear of the license plate 12. In other respects these letters and numerals are of the same construction to those previously described, that is they are formed from separate interengaging sections.

In the modified form illustrated in Fig. 9, the reduced portion 23ª is shown with a convex face. The rear flange 25' may be joined or integral with the flanges of the adjacent letters or numbers.

In Fig. 10 the letters 22ª have concave inner surfaces.

It is to be understood that the letters may be of glass, celluloid or any other transparent composition or material of any desired color.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. In a day and night license plate, a plate with outwardly embossed symbols having cutout portions, letters engaged on the plate and consisting of separate sections and having portions engaging in said cutouts for preventing relative turning of the sections, and coacting means on the letter sections for holding them together in relative positions as engaged on said plate and upon removal from the plate to release the sections upon slight rotation.

2. In a day and night license plate, a plate with outwardly embossed symbols having cutout portions, letters engaged on the plate and consisting of separate sections and having portions engaging in said cutouts for preventing relative turning of the sections, and coacting means on the letter sections for holding them together in relative positions as engaged on said plate and upon removal from the plate to release the sections upon slight rotation, said means including a pin projecting from one of all adjacent pairs of said sections and having a finger engaging in a recess in the other adjacent section of each pair.

3. A day and night license plate for motor vehicles, comprising a plate with outwardly embossed symbols having central cutout portions, symbols of colored glass engaged on the plate at the rear of the embossed portion, said symbols being formed of several separate parts, and a means for holding the parts together, said means comprising a pin fixed on one of adjacent pairs of the sections and having an extending finger engaging in a recess in the other adjacent section.

In testimony whereof I have affixed my signature.

JOHN M. MOORE.